Nov. 18, 1930.  W. JENSEN  1,782,095
LIQUID WHIPPING APPARATUS
Filed Feb. 11, 1929  2 Sheets-Sheet 1
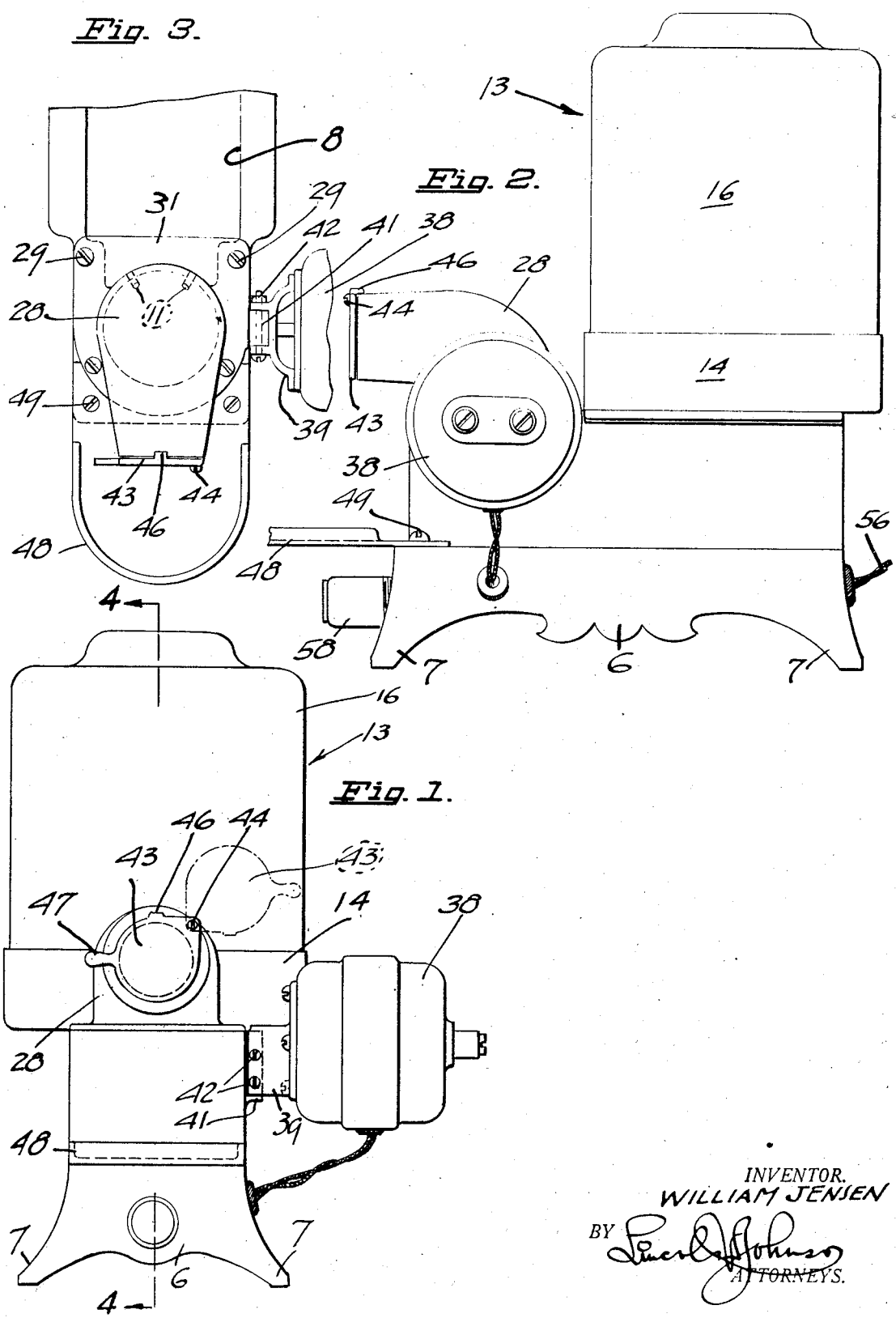
INVENTOR.
WILLIAM JENSEN
BY
ATTORNEYS.

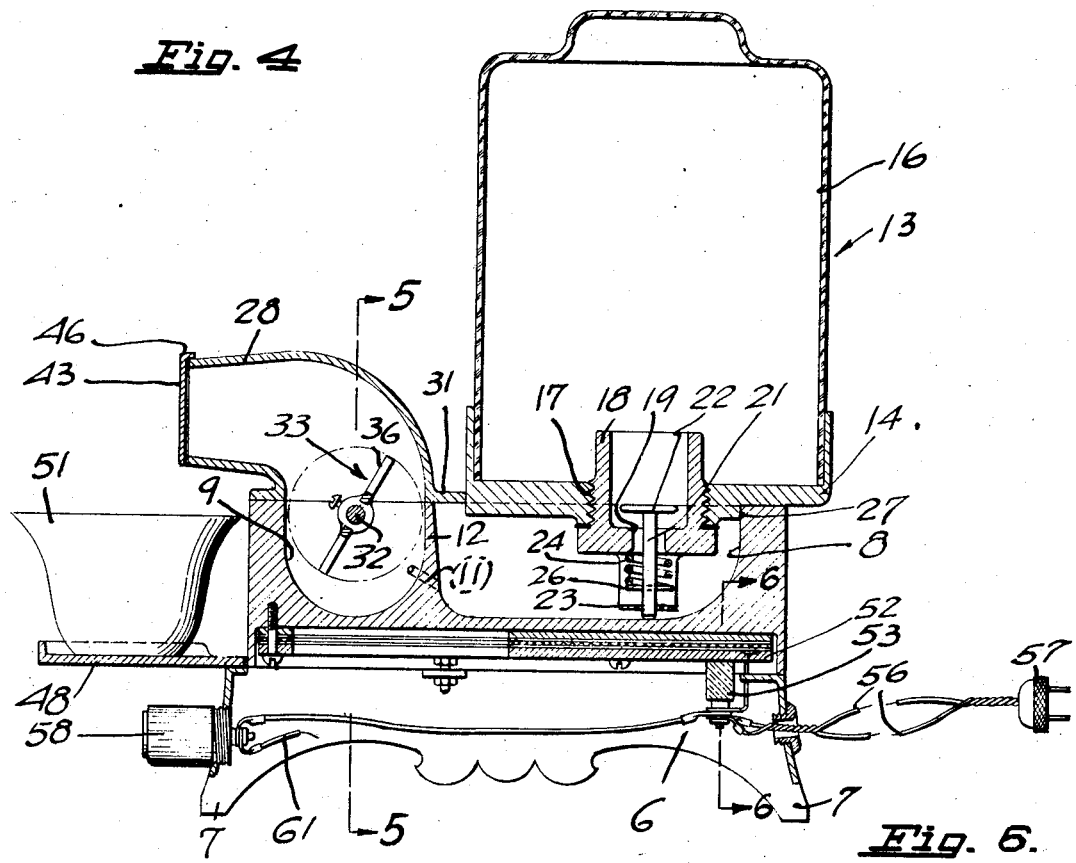
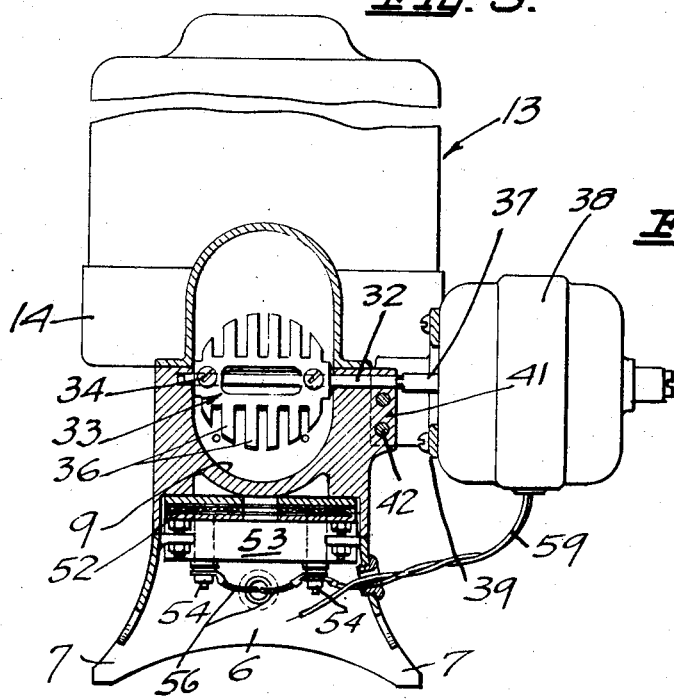
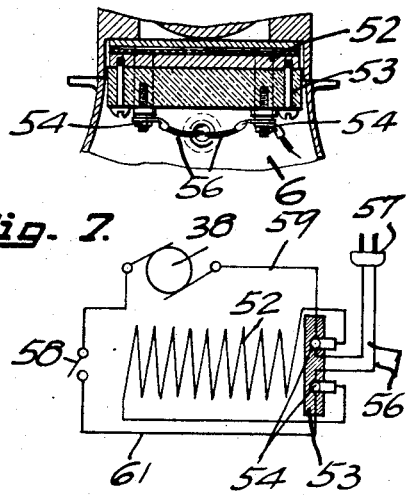

Patented Nov. 18, 1930

1,782,095

UNITED STATES PATENT OFFICE

WILLIAM JENSEN, OF PASADENA, CALIFORNIA

LIQUID-WHIPPING APPARATUS

Application filed February 11, 1929. Serial No. 339,207.

The invention forming the subject matter of this application relates to an apparatus for whipping a liquid into a foam or lather.

The primary object of the invention is the provision of an apparatus in which a liquid solution may be efficiently agitated at will, so as to beat the said solution into a foam or lather, means being provided on the apparatus for allowing the collection of the said foam or lather after the same is forced out of the apparatus.

Particularly the object of the invention is the provision of an apparatus in which a vessel is provided in which the liquid collects, adjacent to which vessel is another vessel adapted to receive the liquid from the first vessel, the second vessel having an electrically operated agitator therein for beating the liquid into a foam or lather thru the outlet of the second vessel, so as to be readily received thereat in a suitable receptacle.

Another object of the invention is the provision of an apparatus for beating a liquid solution into a foam or lather in which the vessels in which the soap solution is collected and agitated are heated, and in which an additional container is provided for a suitable soap solution, the said container having a valve therein, said valve being maintained in an open position by its contact with one of the vessels of the apparatus after the container is positioned on the apparatus; furthermore, means being provided to control the electric agitating means at the will of the operator.

Another object of the invention is the provision of an apparatus of the character described in which two heated vessels are disposed side by side and in communication with each other so that a liquid solution collected in one of said vessels may readily flow into the other vessel, said second vessel having an electrically operated agitating or beating means therein for beating the solution into a foam or lather, and the provision of a container for the apparatus for receiving the solution, which container is provided with a plunger valve so that when the container is positioned above the first vessel the plunger valve contacts with the bottom of said vessel, whereby it is maintained in an open position allowing the collection of the liquid solution in the said first vessel, as the said solution flows from the said container.

Other objects and advantages are to provide an apparatus for whipping a suitable liquid into a foam or lather that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form because it may be embodied in other forms; and it is also to be understood that in and by the claims following the description, it is desired to cover the invention in whatsoever form it may be embodied.

The invention is clearly illustrated in the accompanying drawings in which;

Fig. 1 is a front view of the apparatus constructed in accordance with my invention.

Fig. 2 is a side elevation of the apparatus.

Fig. 3 is a plan view of the outlet end of the apparatus.

Fig. 4 is a sectional view of the apparatus, the section being taken on the line 4—4 of Fig. 1.

Fig. 5 is a sectional end view of the apparatus, the section being taken on the line 5—5 of Fig. 4.

Fig. 6 is a fragmentary sectional view of the connections to the heating element and to the circuit of the electric agitator or beating elements.

Fig. 7 is a wiring diagram showing the electric connections of the heating element and of the electric beating means to a source of electricity.

In carrying out my invention I make use of a base 6 having lugs 7 formed thereon. The base 6 is hollow so as to allow the disposition therein of certain electrical heating and actuating elements to be hereinafter set forth in detail.

On the base 6 are formed two vessels, namely, a larger vessel 8 in which liquid to be whipped such as a soap solution may be collected, and a smaller vessel 9, in which the said soap solution may be agitated or beaten into a foam or lather. The vessels 8 and 9 are in communication with each other through preferably small holes 11 drilled into the wall 12 which separates the vessels from each other. The upper edges of the vessels are in horizontal alignment. On the top of the vessel 8 is disposed a container denoted in its entirety by the numeral 13. The container 13 has a head 14 into which is fixedly secured a receptacle 16, said receptacle being preferably made of porcelain or glass, so as to present a hygenic and clean appearance. In the head 14 is a threaded opening 17 into which is threadedly secured a valve casing 18, in which latter is a valve opening 19. Thru the said valve opening extends a stem 21 of a plunger valve, the valve head 22 of which is disposed within the casing 18. The free end of the stem 21 slidably extends through a lug 23, which lug is formed on the outer face of the valve casing 18 and is spaced therefrom. Between the lug 23 and the outer face of the casing 18 is disposed a tension spring 24. One end of the tension spring bears against the outer face of the casing 18, while the other end thereof bears upon a pin 26 protruding through the valve stem 21. The normal tendency of the tension spring 24 is to force the stem outwardly from the casing 18, thereby automatically seating the valve head 22 when there is no pressure exerted upon the stem 21. It is apparent that when the container 13 is not disposed upon the vessel 8, the plunger valve is automatically closed, thereby preventing the egress of the soap solution or the fluid contained therein. The container 13 is filled with a soapy solution through the threaded opening 17, after the valve casing 18 is removed therefrom. Usually soap flakes or powder is introduced in a mixture with water, into the container so as to form a soapy solution, but it is to be understood that any soap solution formed by flakes, powder or shaving creams may be introduced into the container. While the solution is introduced into the container 13, the container is so disposed that the threaded opening in the head thereof is on the top. After the desired solution is poured into the container 13, the valve casing 18 is screwed in place and the automatically closed plunger valve prevents the escapement of the solution therefrom.

It is to be noted that the head 14 of the container 13 is so formed that a portion thereof protrudes into the container 8, said portion forming a shoulder as at 27 which engages an inner edge of the vessel 8, thereby preventing accidental lateral or longitudinal movement relative to the vessel 8. The valve casing 18 and the plunger valve therein, are so proportioned that when the container 13 is in place, the free end of the valve stem 21 abuts against the bottom of the vessel 8, whereby the tension spring 24 is compressed and the head of the valve 22 is forced with the stem 21, in the open position thereof, as clearly illustrated in Fig. 4. It is to be noted that the container 13 is filled through the bottom thereof and the valve of said container 13 is normally closed when the container is removed, and is automatically opened when the container is placed in operative position upon the vessel 8.

When the container 13 is in operative position, the fluid therefrom flows by its own gravity into the vessel 8. The fluid collects in said vessel 8 but a part thereof flows through the holes 11 into the vessel 9. The vessel 9 is covered by an outlet tube 28 which is removably secured upon the top of the vessel 9 by means of screws 29. The tube 28 is formed in the shape of an elbow so that it discharges in a substantially horizontal direction. It is to be noted that a flange 31 of the top 28 projects over the vessel 8 and that when the container 13 is in operative position, the side of the head 14 thereof is slidably disposed along side the free edge of the flange 31, whereby the container 13 is held firmly supported in its operative position.

In the vessel 9 is rotatably supported an agitator shaft 32 upon which is mounted a beater or agitator blade 33, which latter is disposed within the vessel 9 and is detachably secured upon the shaft 32 by means of screws 34. The branches 36 of the beating blade, 33 extend in parallelism with each other and substantially at right angles to the shaft 32.

One end of the shaft 32 extends outside of the vessel 9 to which is connected a shaft 37 of an electric motor 38. Said electric motor is mounted on a bracket 39, which bracket is detachably secured to a lug 41 on the outside of the vessel 9 by means of bolts 42.

The rotation of the motor 38 will cause the rotation of the agitator or beater 33, which in turn will beat the liquid such as the soapy solution within the vessel 9 into a foam or lather and force the foam or lather into the outlet tube 28. The opening of said outlet tube is obstructed by a closure 43 which is pivotally secured as at 44 to the end of the tube 28. Said closure 43 has an ear 46 thereon which extends over the end of the tube 28 and on the top of said end. The pivotal connection 44 and the ear 46 are in such relative position that when the closure is in a foam obstructing position, it is supported in that position by its own gravity, which rests the ear 46 upon the top of the tube 28. The moving of the closure into open position is accomplished manually and to facilitate such moving, a handle extension 47 is provided at one side of the closure 43. When the closure 43 is in the position shown in dash and dotted lines in Fig. 1, then the free egress of the foam or lather from the tube 28 is unobstructed. It is to be noted that instead of the structure of the closure hereinbefore set forth, any other suitable structure may be adopted such as a spring hinge closure which is closed automatically by the action of a tension spring.

Outside of the vessel 9 and below the open end of the tube 28, is a platform 48 secured to the base 6 by means of screws 49. The platform is supplied for the purpose of supporting a cup 51 below the open end of the tube 28 so as to receive the foam or lather therefrom.

In connection with soap suds and a soap solution, it was found desirable to heat the vessels 8 and 9 so as to beat the soap solution into a lather or foam more rapidly than it is possible when the same is accomplished in cold vessels. I heat the vessels by means of an electric heater element 52 secured below the bottom of the vessels 8 and 9. From the rear end of the heating element 52 extends an insulating block 53 in which are held terminals 54. The terminals 54 are connected to the respective ends of the heating coil in the heating element 52. Electrical conduits 56 are connected to the terminals 54. The other ends of said conduits 56 are secured in the usual manner into an electric plug 57 for the connection of the heater to a source of electricity.

Due to the short time necessary for beating up a certain amount of latter or foam, it is not necessary to operate the agitator and the motor 38 continually. In order to readily control the starting and stopping of the motor 38, I provide a normally open circuit breaker 58 which is secured in the base 6 just below the platform 48 so that the same is readily accessible at the same time when the cup 51 is placed in position upon the platform 48. The circuit breaker 58 is preferably of the push button type which automatically opens the circuit when the pressure upon the button thereof is removed. The connection of the motor 38 and of the circuit breaker 58 to the electric circuit heretofore set forth, is clearly shown in the wiring diagram, Fig. 7. A conduit 59 connects a terminal of the motor 38 to one of the terminals or binding posts 54, while the circuit breaker 58 is connected in series between the other terminal of the motor 38 and a conduit 61 connecting to the other binding post terminal 54. Thus it is evident that the heating element is always connected to a source of electricity when the plug 57 is engaged in a corresponding electrical socket, but the motor 38 is connected to a source of electricity only at the time when the operator presses the button of the circuit breaker 58.

In operation, the container is filled up with a liquid solution through the threaded opening 17, after the valve casing 18 is removed. Then the valve casing is reinserted and the container is turned upside down and placed upon the vessel 8, whereby the plunger valve is opened and the solution from the container 13 flows into the vessel 8 and collects therein. Part of this solution flows into the second vessel 9. When the plug 57 is connected in the usual socket, the heating element 52 heats the walls of the vessels 8 and 9. When a soapy lather or foam is required, the operator, usually the barber, places the cup 51 upon the platform 48, leaves the closure 43 in the obstructing position, then presses the button of the circuit breaker 58, thereby setting the motor 38 in operation. The rotation of the motor 38 rotates the beating or agitator blade 33, whereby a suitably thick lather or foam is formed in the vessel 9, which is forced into the tube 28 toward the open end thereof. The solution is beaten into a foam in a very short time, after which the operator moves the closure 43 as shown in dotted line position in Fig. 1, allowing the egress of the lather or foam from the tube 28 and into the cup 51. When the proper soapy solution is used, the foam or lather is created almost instantaneously so that the closure 43 may be moved in the unobstructing position almost at the same time when the button of the circuit breaker 58 is pressed.

It will be recognized that a particularly compact and facile device is provided to accomplish the instantaneous beating of a solution into a foam or lather; the device is of a unitary character, does not require any adjustment or setting up; it is also to be noted that with a few minor changes in the construction of the vessels, the device may be readily adapted to be used in connection with shaving creams which are usually heavier then the soapy solution formed from soap flakes or soap powder and water; the operation of the device is simple, it does not require any particular experience or skill, therefore it readily lends itself to effective use.

While in the aforesaid illustration I described my apparatus as used in connection with beating up a foam or lather from a soap solution, it is to be understood that the device may be used for whipping any suitable liquid into a foam and such operation would not necessitate any change of structure or operation of the apparatus heretofore set forth.

Having thus described this invention, what I claim and desire to secure by Letters Patent is:

1. A liquid whipping apparatus comprising a base; a partition to divide the base into two communicating vessels; means common to both vessels to heat the same; a container for said liquid communicating with one of said vessels; and means for beating the liquid into a foam in the other vessel.

2. A liquid whipping apparatus comprising a base; a partition to divide the base into two communicating vessels; a container for said liquid communicating with one of said vessels; electrically operated means for beating the liquid into a foam in the other vessel; and means adjacent the bottom of the base being common to both vessels for heating the solutions therein.

3. A liquid whipping apparatus comprising a base; a partition to divide the base into two communicating vessels; a container for the liquid to be whipped supported on one vessel, said container having an opening thereon, automatically closed means to control the flow thru said opening, said container being adapted to be connected to one of said vessels so that the connection thereof holds said flow controlling means in open position; and means for beating the liquid into a foam in the other vessel.

4. A liquid whipping apparatus comprising a base; a partition to divide the base into two communicating vessels; a container for the liquid to be whipped; means to allow communication of said container with one of said vessels, said means being adapted to be opened by the connection of said container to said first vessel; means for beating the liquid into a foam in the other vessel, said container being removably positioned on one of said vessels, and having an opening in the lower end thereof; a resiliently closed valve in said opening, being adapted to abut against a wall of said first vessel so as to be held in open position thereby; and means for beating the liquid into a foam in the other vessel.

5. A liquid whipping apparatus comprising a base; a partition to divide the base into two communicating vessels; a container for the liquid to be whipped; a valve casing removably secured in the lower end of said container; a resiliently closed plunger valve in said casing projecting beyond the wall of the container, said container being removably positioned upon one of said vessels, the said plunger valve abutting against a wall of said vessel so as to be held open thereby; and means for beating the liquid into a foam in the other vessel.

6. A liquid whipping apparatus comprising a base; a perforated partition integral with the base to divide the same into two communicating vessels; a container for the liquid to be whipped, said container having an opening thereon, automatically closed means to control the flow thru said opening, said container being adapted to be connected to one of said vessels so that the connection thereof holds said flow controlling means in open position; means for beating the liquid into a foam in the other vessel; and means common to both vessels to heat the same.

7. A liquid whipping apparatus comprising a base; a perforated partition integral with the base to divide the same into two communicating vessels; a container for the liquid to be whipped; means to allow communication of said container with one of said vessels, said means being adapted to be opened by the connection of said container to said first vessel; means for beating the liquid into a foam in the other vessel, said container being removably positioned on one of said vessels, and having an opening in the lower end thereof; a resiliently closed valve in said opening, being adapted to abut against a wall of said first vessel so as to be held in open position thereby; means for beating the liquid into a foam in the other vessel; and means common to both vessels to heat the same.

8. A liquid whipping apparatus comprising a base, a partition to divide the base into two communicating vessels; a container supported on one vessel to hold the liquid to be whipped; said container having an aperture at an end thereof thru which the container is fed; said container being supported on the side of the vessel in an inverted position so as to allow gravity flow thru said aperture; means to control the flow of liquid thru said aperture, said means being adapted to be opened and maintained in open position by its connection with the base when the said container is supported in inverted position above said base; and means for beating the liquid into a foam in the other vessel.

In testimony whereof, I have hereunto set my hand at San Francisco, California, this 25th day of January, 1929.

WILLIAM JENSEN.